J. A. CAMERON & G. B. BIRCH.
REWINDING MACHINE.
APPLICATION FILED APR. 18, 1914.

1,256,499.

Patented Feb. 12, 1918.
5 SHEETS—SHEET 1.

WITNESSES:
Harry E. McGill.
Teresa V. Lynch

INVENTORS
James A. Cameron and
Gustaf B. Birch
BY
Axel V. Beeken
ATTORNEY

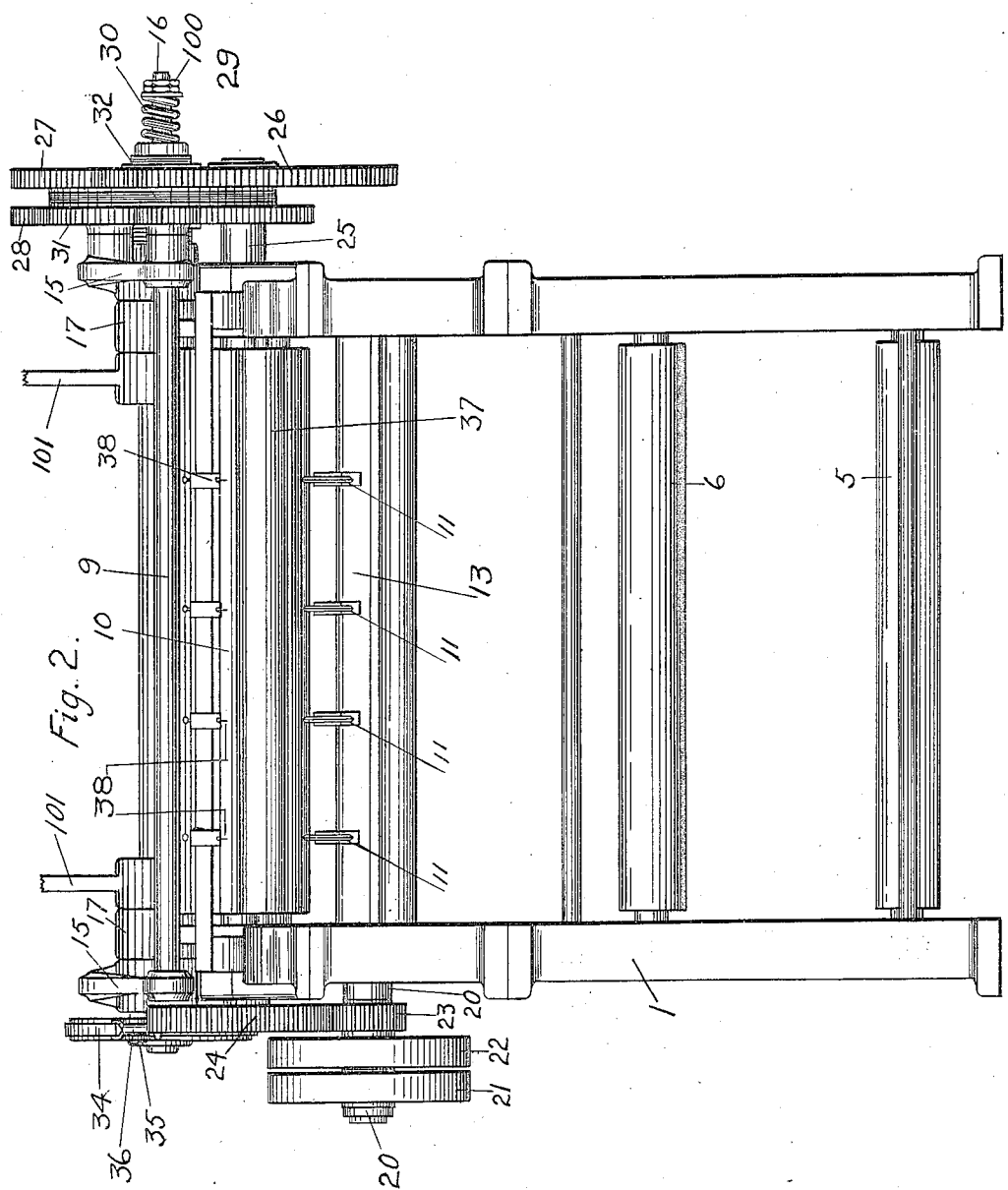

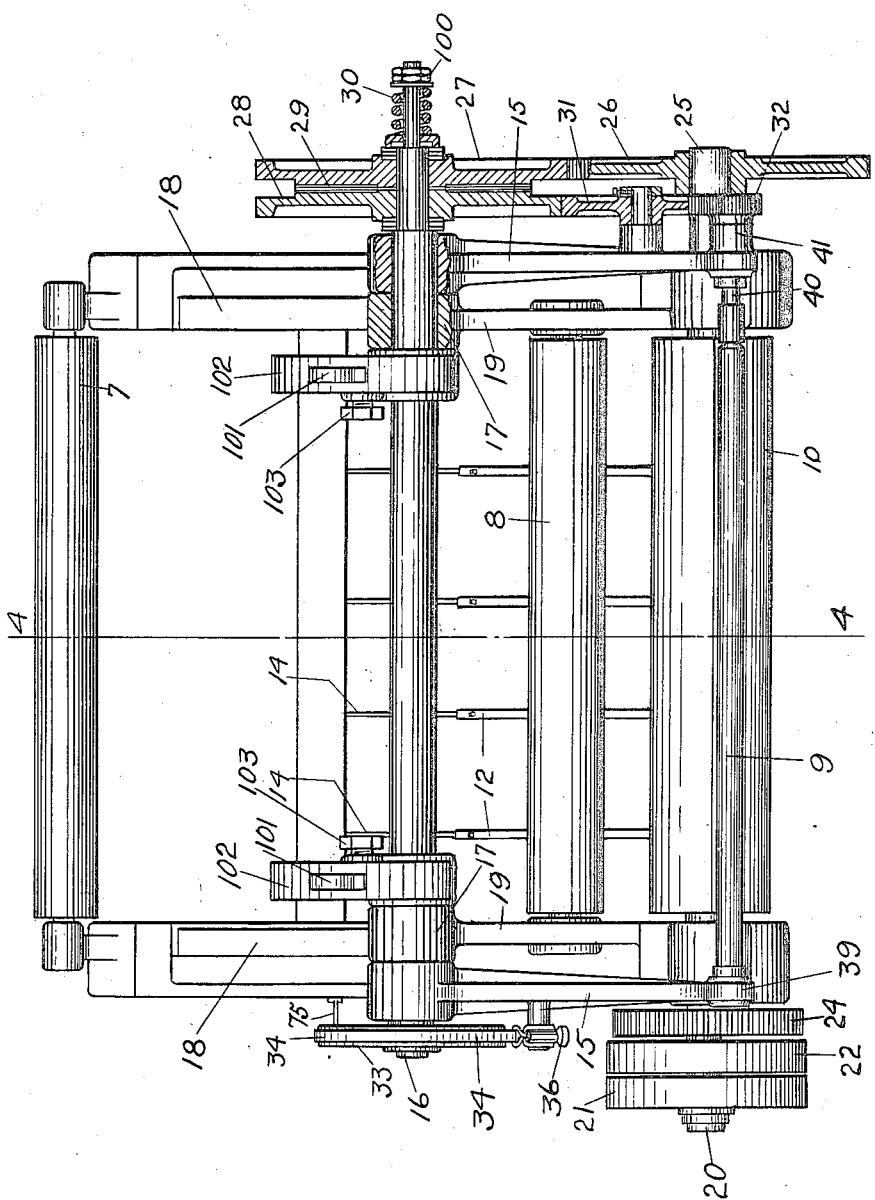

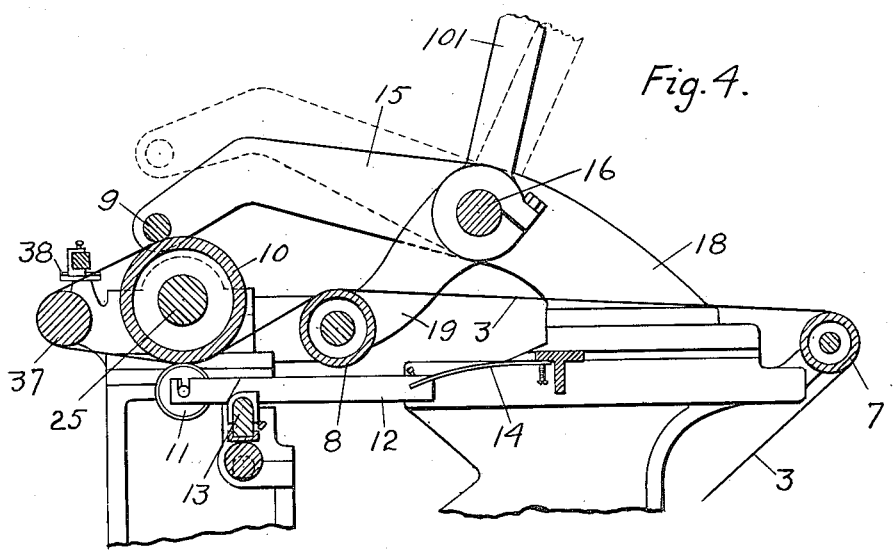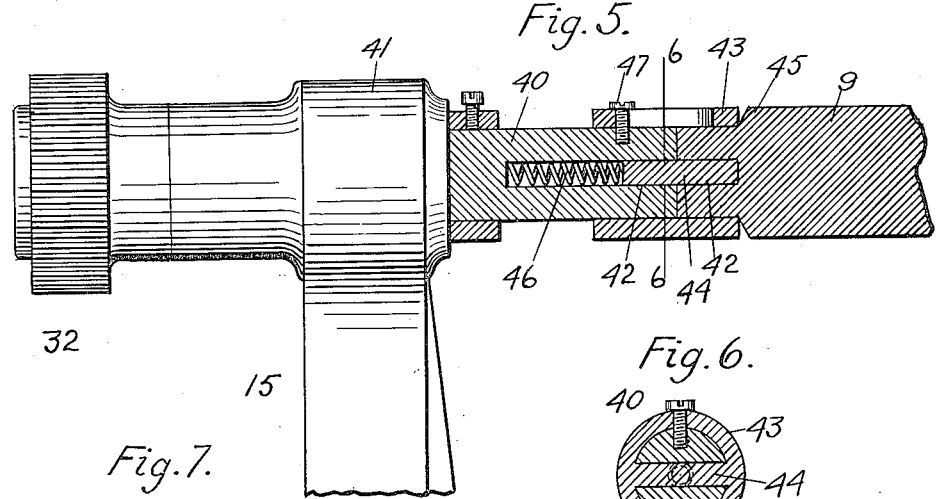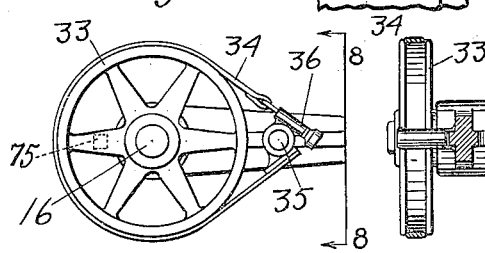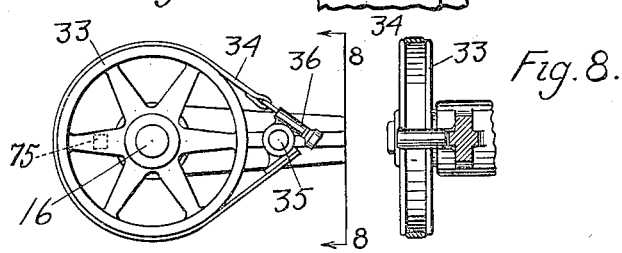

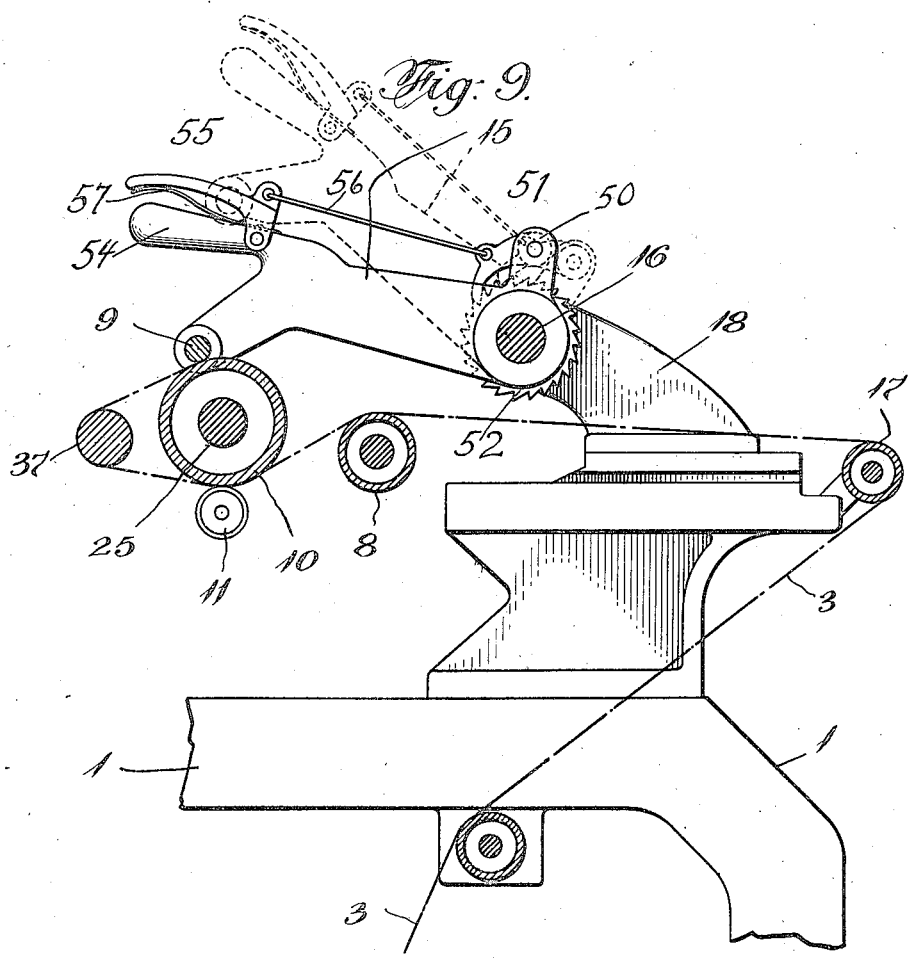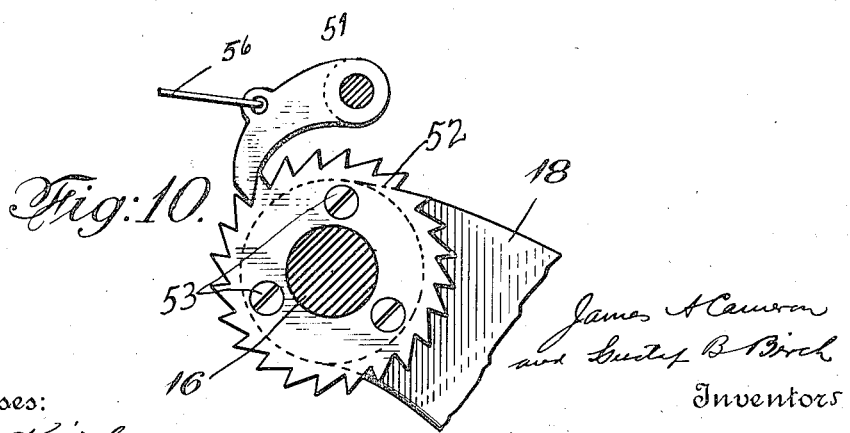

UNITED STATES PATENT OFFICE.

JAMES A. CAMERON AND GUSTAF BIRGER BIRCH, OF BROOKLYN, NEW YORK, ASSIGNORS TO CAMERON MACHINE COMPANY, OF BROOKLYN, NEW YORK, A CORPORATION OF NEW YORK.

REWINDING-MACHINE.

1,256,499.          Specification of Letters Patent.          Patented Feb. 12, 1918.

Application filed April 18, 1914. Serial No. 832,759.

*To all whom it may concern:*

Be it known that we, JAMES A. CAMERON and GUSTAF B. BIRCH, both citizens of the United States, and residents of the borough of Brooklyn, in the county of Kings, city and State of New York, have invented certain new and useful Improvements in Rewinding-Machines, of which the following is a specification.

The present invention relates to rewinding machines or rewinding and slitting machines of the type known as center rewind, and has for its object the production of a simple structure of this type which will rewind or slit and rewind materials such as paper, cloth, etc., in an efficient and expeditious manner.

The invention consists broadly in a slitting member which is driven at a constant rate of speed and a rewinding shaft initially driven at such speed as will properly rewind the material from the slitting member and which will compensate for the variations in speed as the material accumulates thereon by the resistance offered by the material through the increase of speed.

It is to be understood that the rewinding shaft may rest against a supporting member or may be suspended or held in spaced relation with respect to the slitting members, as may be desired, but in one form of the invention, as here shown, the rewinding shaft is pivotally mounted to a point eccentric to its axis and rests against a member with relation to which it is spaced as the diameter of the material increases. The member against which the said rewinding shaft rests will preferably be a web feeding roll, and, in the present instance, a backing roller with which a suitable cutting member coöperates, while the means for mounting the rewinding shaft will preferably consist of arms mounted on a rockshaft. The means for driving the center or rewinding shaft preferably consists of a gear whose axis is coincident with the pivotal support of the arms, together with driving connection as gears carried by the said arms, whereby the rewinding shaft will be driven in any position. In order to impart variable speed to the rewinding shaft in accordance with the diameter of the rewound material, power is applied to the shaft on which the arms are supported by means of a slip driving device. It is preferred, as a matter of design, to impart motion to a gear loose on said rockshaft by suitable transmission devices from the backing roll against which the rewinding shaft rests, motion being imparted to this backing roll in any suitable manner.

It will thus be observed that the device when arranged as above described consists of a web feeding or backing roll, a rewinding shaft resting on said roll and mounted to be displaced with reference thereto as the diameter of the rewound material increases, together with means for driving the web feeding or backing roll at a constant speed, while the rewinding shaft is driven at variable speeds. In view of the inter-connection of the gearing, the slip driving device referred to above is necessary. In this preferred construction, the rewinding shaft is held under tension against the web feeding or backing roll and this may conveniently be accomplished by mounting a pulley loosely on the rockshaft carrying the the arms of the rewinding shaft and fast to the framework of the machine by means of lever 75, and to provide a brake band which has suitable connection with one of said arms so that the rocking of the said shaft will furnish power for exerting a pressure to hold the rewinding shaft against the web feeding or backing roll.

In order to prevent the rewound material from bearing more and more heavily against the member with which it contacts, counterweights are arranged on the arms carrying the rewinding shaft which become increasingly effective as the shaft is displaced, so that the effective weight of the rewinding shaft is substantially constant notwithstanding the increase of rewound material thereon. Or, to put it differently, means for automatically compensating for the increase in the weight of the rewound material are provided, whereby the effective pressure of the rewound material is substantially constant.

Other features of construction will appear as the specification proceeds.

In the accompanying drawings the invention is embodied in a concrete and preferred form but changes of construction may be made within the scope of the appended claims without departing from the invention.

In the said drawings:

Fig. 2 is a front elevation thereof looking in the direction of the arrow 2 of Fig. 1.

Fig. 3 is a top plan view partly in section.

Fig. 4 is a vertical sectional view of the upper portion of the machine on the line 4—4 of Fig 3.

Fig. 5 is a detail view of the construction of the rewinding shaft.

Fig. 6 is a sectional view on the line 6—6 of Fig. 5.

Fig. 7 is a fragmentary detail view of the brake band for exerting pressure on the rewinding shaft.

Fig. 8 is a sectional view on the line 8—8 of Fig. 7, showing also the brake band in section.

Fig. 9 is a vertical sectional view similar to Fig. 4 illustrating a modified construction of the invention whereby the rewinding shaft may be suspended in spaced relation with respect to the slitting members.

Fig. 10 is an enlarged fragmentary view showing in detail the dog and ratchet arrangement of the modified construction.

Similar characters of reference indicate corresponding parts in the different views.

Figure 1:
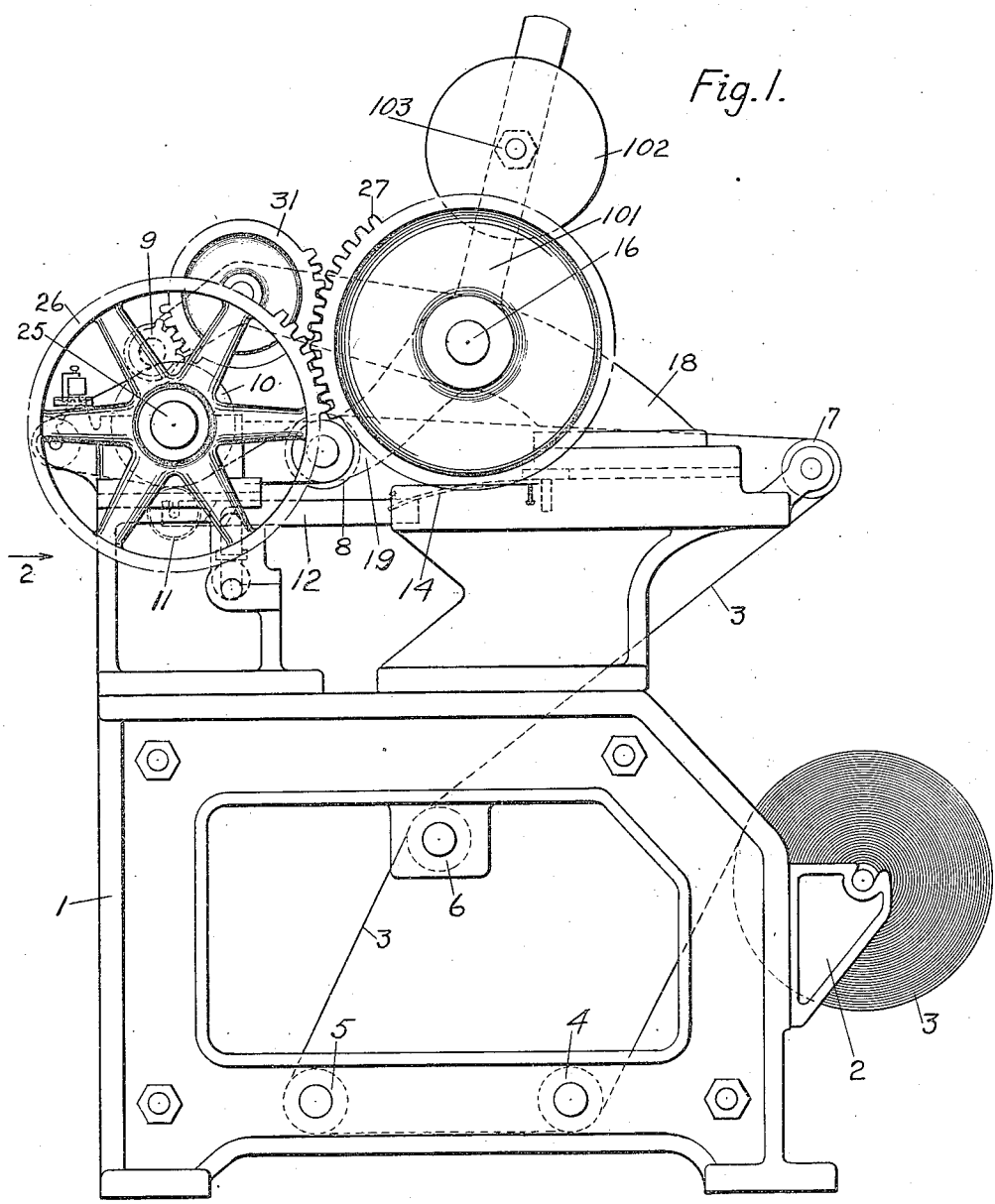
Figure 1 is a side elevation of a machine embodying the invention.

1 indicates the framework which may be of any suitable construction and having the brackets 2 on which may be mounted the web of material 3 to be slitted and rewound. Suitable guide rolls as 4, 5, 6, 7 and 8 are provided for leading the web 3 through the machine.

9 indicates the rewinding shaft resting against the member 10, which, in the present instance, is a web feeding roll as well as a backing roll for the cutting member 11.

This backing roll 10 and cutting member 11 will preferably be of the construction disclosed in Letters Patent No. 1,076,189, that is to say, the backing roll will have a glass-hardened surface harder than the cutting members 11, and the said cutting members 11 will be in the form of score cutters suitably mounted in arms 12 which rest on the cross-member 13 and are held under tension by means of the spring 14.

The rewinding shaft 9 is mounted in the ends of the arms 15, which arms are mounted on the rockshaft 16. The rockshaft 16 is mounted in suitable bearings 17 on the bracket 18, from which bracket extend the rigid projections 19 in which are supported the guide roll 8. 20 indicates a stub shaft having loose and fast pulleys 21 and 22 and carrying further a pinion 23 engaging with a gear 24 on the shaft 25 of the backing roll 10. On the other side of the machine, this shaft 25 has mounted on it a gear 26 which engages with a gear 27 loose on the rockshaft 16. On the rockshaft 16 there is another gear 28 between which and the gear 27 there is a slip driving device 29 consisting of friction disks, the two gears and the friction disks being held closely together by means of the spring 30 in a well known manner. By adjusting the nut 100 the tension of the device may be varied without stopping the machine. Mounted on one of the arms 15 is a pinion 31 which meshes with the gear 28 and with a gear 32 on the end of the rewinding shaft 9. It will be observed that the gear 28 being coincident with the pivotal axis of the arms 15, the rewinding shaft 9 will be driven irrespective of its position with reference to the backing roll 10. It will further be observed that the said backing roll is driven at a constant speed, and it is obvious that the rewinding shaft 9 must be driven at a gradually reduced speed as the diameter of the rewound material increases, in order that said rewinding shaft may not take up the material faster than it is fed by the backing roll 10—hence the slip driving device which permits the rewinding shaft to be driven at variable speeds determined or controlled by the diameter of the rewound material. By this means the material will be rewound on the shaft 9 very tightly and evenly.

In order to provide a sufficient tension on the rewinding shaft with respect to the backing roll 10, the rocking of the rockshaft 16 is utilized by means of the pulley 33 loose on the end of said shaft and fast on the framework by means of arm 75, to which pulley a brake band 34 is applied, which brake band is connected to the member 35 carried by one of the arms 15, and which brake band may be tightened or loosened by means of the screw 36. In this manner the rocking movement of the arms 15 is retarded by the slippage between the band 34 and pulley 33.

The web is led over the various guide rolls to the backing roll 10 where it is slitted by the cutting member 11, and it may then pass directly up to the rewinding shaft 9. Under some circumstances it may, however, be preferred to deflect the web over the roll 37 and to permit the blade 38 to cut any threads which may still connect the web sections. This device is more fully explained in said Letters Patent No. 1,076,189. For the sake of simplicity this device has been omitted in Fig. 3, but is shown in Figs. 1, 2 and 4.

In order to make the rewinding shaft readily removable and detachable from the machine so that the coils of rewound material may be taken therefrom, we mount the said shaft 9 in a bearing 39 of a usual construction in one of the arms 15. The other arm 15, however, has a driving shaft 40 mounted in the bearing 41 and in line with the said rewinding shaft 9. Said shafts are provided with complementary slots 42 and are connected by means of a sleeve or collar 43 which is provided with a web 44 adapted to engage in the complementary slots 42. The shafts 9 and 40 abut against each other. The screw 47 tends to prevent the parts from coming apart and the spring 46 presses the collar 43 home against the shaft 9. When it is desired to disconnect the shaft 9, the sleeve or collar 43 is moved to the left, carrying with it the web 44 which thus moves out of the slot 42 in the shaft 9, when said shaft may be readily removed from its bearing 39 in the other arm 15.

Mounted on the rockshaft 16 are inclined arms 101 carrying the counterweights 102 adjustably secured by means of the set screws 103. As the diameter of the rewound material increases the rockshaft 16 will turn and the counterweights 102 will assume more and more of an inclined position thereby compensating for the increased weight of said material, so that the pressure of the rewound material against the member 10 is substantially constant. By adjusting the counterweights 102 the amount of pressure with which the material bears against the member 10 may be varied, or the rewound coils may be relieved of the pressure against 10 due to their own weight.

It may, however, be found desirable to suspend the rewinding shaft 9 in some fixed position with respect to the feeding or backing roll 10 in lieu of having the shaft 9 to rest or bear against the same, as shown in Fig. 4. In such event applicants provide the arms 15 adjacent their pivoted ends with a lateral extension 50 which has pivotally mounted thereon the dog 51. This dog 51 engages with the ratchet 52 surrounding the rockshaft 16 and which is secured to the brackets 18 by the screws or fastening members 53, thereby affording means for adjustably supporting the arms in a suspended position. For conveniently raising and lowering the arms 15 the opposite or free ends thereof are formed with a suitable handle portion 54 which has pivoted thereto the grip lever 55 connected by the rod 56 to the dog 51 for actuating the same. A leaf spring 57 is interposed between the handle 54 and grip member 55 for normally forcing the grip member outwardly from the handle 54 and, by the rod connection 56, for normally placing the dog in engagement with the ratchet teeth 52. By this construction, shown in Figs. 9 and 10, the rewinding shaft 9 may be adjustably supported in spaced relation with respect to the roller 10 and may be raised and lowered as occasion requires and the counterweight member 102 is dispensed with. The web 3 will be fed direct from the roller 37 to the rewinding shaft and will be wound tightly thereupon by the gradual increase of speed of the shaft 9, due to the increasing diameter of the web being wound upon, although the excess strain placed upon the web by the increasing speed will be compensated for by the slip gears 27 and 28, which have been previously described.

What is claimed, is:

1. A rewinding machine comprising a feeding roller, a rewinding shaft, pivotally mounted supporting arms carrying said rewinding shaft, a gear having a center of rotation coincident with the support of said arms, means for driving said roller and said gear, and transmission mechanism on the arm between said gear and the rewinding shaft.

2. A rewinding shaft comprising a feeding roller, a rewinding shaft, arms pivotally mounted supporting said rewinding shaft, means for driving said roller, transmission mechanism on said arms for rotating said shaft, and a slip driving device between said first-mentioned driving means and said transmission mechanism to impart motion thereto.

3. A rewinding machine comprising a supporting shaft, arms mounted on said supporting shaft, a rewinding shaft carried by said arms, a feeding roller, means for driving said roller, a slip device mounted loosely on the supporting shaft and driven from said roller, and means for driving said rewinding shaft from the slip driving device.

4. A rewinding machine comprising a feeding roller, a pivotally mounted rewinding shaft, means to support the shaft at points about its pivot, means for driving said feeding roller at a constant speed, and a slip driving device connected with the said shaft to drive the same and to compensate for the variations in the speed thereof caused by the diameter of the material upon the rewinding shaft.

5. A rewinding machine comprising: a rewinding shaft pivotally mounted at a point eccentric to its axis, a member against which said rewinding shaft rests and with relation to which it is displaced as the diameter of the rewound material increases, and means other than the material on the same for rotating said rewinding shaft.

6. A rewinding machine comprising: a rewinding shaft pivotally mounted at a point eccentric to its axis, a member against which said rewinding shaft rests and with relation to which it is displaced as the diameter of the rewound material increases, and means for rotating said rewinding shaft at variable speeds controlled by the diameter of the rewound material on the shaft.

7. A rewinding machine comprising: a rewinding shaft pivotally mounted at a point eccentric to its axis, a member against which said rewinding shaft rests and with relation to which it is displaced as the diameter of the rewound material increases, and means for rotating said rewinding shaft including a slip driving device.

8. A rewinding machine comprising: a rewinding shaft, a feeding roller with which said rewinding shaft engages, pivotally supported arms carrying said rewinding shaft, a gear having its center of rotation coincident with the pivotal support of the arms, and transmission mechanism on the arms between the first gear and the rewinding shaft.

9. A rewinding machine comprising: a rewinding shaft, pivotally supported arms carrying said rewinding shaft, a gear having its center of rotation coincident with the pivotal support of the arms, transmission mechanism on the arms between the first gear and the rewinding shaft, and a slip driving device imparting motion to the first gear.

10. A rewinding machine comprising: a rockshaft, arms on said rockshaft, a rewinding shaft carried by said arms, a member against which said rewinding shaft rests and with relation to which it is displaced as the diameter of the rewound material increases, rotatable means loosely mounted on said rockshaft, means for imparting the rotation of said rotatable means to the rewinding shaft, and means actuated by the rocking of said rockshaft for holding the rewinding shaft under tension against the member with which it contacts.

11. A rewinding machine comprising: a rockshaft, arms on said shaft, a rewinding shaft carried by said arms, a member against which said rewinding shaft rests and with relation to which it is displaced as the diameter of the rewound material increases, a slip driving device loosely mounted on said rockshaft, means for driving the rewinding shaft from the slip driving device, means actuated by the rocking of said rockshaft for holding the rewinding shaft under tension against the member with which it contacts.

12. A rewinding machine comprising: a rockshaft, arms mounted on said shaft, a rewinding shaft carried by said arms, a member against which said rewinding shaft rests and with relation to which it is displaced as the diameter of the rewound material increases, means for driving said member, loosely mounted means on the rockshaft driven from said member, and means for driving the rewinding shaft from the loosely mounted means.

13. A rewinding machine comprising: a rockshaft, arms mounted on said rockshaft, a rewinding shaft carried by said arms, a member against which said rewinding shaft rests and with relation to which it is displaced as the diameter of the rewound material increases, means for driving said member, a slip drive device mounted loosely on the rockshaft and driven from said member, and means for driving the rewinding shaft from the slip drive device.

14. A rewinding machine comprising: a rockshaft, arms on said rockshaft, a rewinding shaft carried by said arms, a member against which said rewinding shaft rests and with relation to which it is displaced as the diameter of the rewound material increases, a pulley loose on said rockshaft, and stationary on the framework, a brake band on said pulley, and means connecting one of said arms with said brake band.

15. A rewinding machine comprising: a web feeding roll, a rewinding shaft pivotally mounted at a point eccentric to its axis, said rewinding shaft resting on said web feeding roll and adapted to be displaced with reference thereto as the diameter of the rewound material increases, means for driving said web feeding roll at a constant speed, and driving connections for driving the rewinding shaft at a variable speed depending upon the diameter of the rewound material.

16. A rewinding machine comprising: a web feeding roll, a rewinding shaft pivotally mounted at a point eccentric to its axis, said rewinding shaft resting on said web feeding roll and adapted to be displaced with reference thereto as the diameter of the rewound material increases, and interconnected driving means for rotating said web feeding roll and said rewinding shaft, the former at a constant speed and the latter at a variable speed depending upon the diameter of the rewound material.

17. A rewinding machine comprising: a web feeding roll, a rewinding shaft pivotally mounted at a point eccentric to its axis, said rewinding shaft resting on said web feeding roll and adapted to be displaced with reference thereto as the diameter of the rewound material increases, and interconnected driving means for driving said web feeding roll and said rewinding shaft, including a slip driving device whereby the web feeding roll is driven at a constant speed and the rewinding shaft is driven at a variable speed depending upon the diameter of the rewound material.

18. A rewinding machine comprising: a rewinding shaft pivotally mounted at a point eccentric to its axis, a member against which said rewinding shaft rests and with relation to which it is displaced as the diameter of the rewound material increases, means other than the material on the rewinding shaft for driving the latter, and means for maintaining the effective weight of the rewinding shaft against the member aforesaid substantially constant notwithstanding the increase of rewound material thereon.

19. A rewinding machine comprising: a rewinding shaft pivotally mounted at a point eccentric to its axis, a member against which said rewinding shaft rests and with relation to which it is displaced as the diameter of the rewound material increases, means other than the material on the rewinding shaft for driving the latter, and means for automatically compensating for the increase in weight of the rewound material so as to maintain the effective pressure of the rewound material against the member aforesaid substantially constant.

20. A rewinding machine comprising: a feeding roller, a rewinding shaft, arms pivotally supporting said rewinding shaft, interconnecting means for rotating said feeding roller and rewinding shaft, the former at a constant speed and the latter at a variable speed depending upon the diameter of the rewound material.

21. A rewinding machine comprising: a feeding roller, a rewinding shaft, arms pivotally supporting said rewinding shaft, means to drive said feeding roller at a constant speed, and driving connections for said rewinding shaft to compensate for the variations in speed thereof due to the accumulation of material thereon.

22. A rewinding machine comprising: a feeding roller, a rewinding shaft, arms pivotally supporting said rewinding shaft, interconnecting driving means for driving said feeding roller and said rewinding shaft, including a slip driving device whereby the feed roller is driven at a constant speed and the rewinding shaft is driven at a variable speed, depending upon the diameter of the rewound material.

23. A rewinding machine comprising: means, having a constant speed, for engaging with the surface of the coils to be rewound, a rewinding shaft, having a variable speed depending upon the diameter of the rewound coils, engaging with the center of the coils to be rewound to hold the coils against the first means and means other than the material on the rewinding shaft for driving the latter.

24. A rewinding machine comprising: means, having a constant speed, adapted to engage with the surface of the rewound coils, a rewinding shaft, driven at a speed depending upon the diameter of the rewound coils, for supporting the latter, means for causing the rewinding shaft to sustain substantially the entire load of the rewound coils so as to rewind said coils without appreciable surface pressure, and means other than the material on the rewinding shaft for driving the latter.

25. A rewinding machine comprising: means, having a constant speed, adapted to engage with the surface of the rewound coils, a rewinding shaft, adapted to be displaced with reference to the first means, and driven at a speed depending upon the diameter of the rewound coils for supporting the latter, means for variably counterweighting said rewinding shaft and the load carried thereby to press the rewound coils against the surface rewinding means with a variable pressure, and means other than the material on the rewinding shaft for driving the latter.

26. A rewinding machine comprising: means, having a constant speed, for engaging with the surface of the coils to be rewound, a rewinding shaft, adapted to be displaced with reference to the first means, having a variable speed depending upon the diameter of the rewound coils, means for automatically compensating for the increase in weight of the rewound coils carried by the rewinding shaft due to the accumulation of material thereon, and means other than the material on the rewinding shaft for driving the latter.

Signed at borough of Brooklyn, city New York, in the county of Kings and State of New York, this 14th day of April, A. D. 1914.

JAMES A. CAMERON.
GUSTAF BIRGER BIRCH.

Witnesses:
C. H. MERRITT,
JOHN L. C. MAYAR.